(12) United States Patent
Mor et al.

(10) Patent No.: US 6,588,324 B1
(45) Date of Patent: Jul. 8, 2003

(54) DEVICE FOR DISTRIBUTING COOKING JUICES OVER MEAT PIECES DURING COOKING

(76) Inventors: Yitzchak Mor, 9 Rechov Irit, Ramat Tivon (IL), 36000; Medardo Reggiani, 24, Via A. Aleardi, Reggio Emilia (IT), 42100

( * ) Notice: Subject to any disclaimer, the term of this patent is extended or adjusted under 35 U.S.C. 154(b) by 0 days.

(21) Appl. No.: 10/192,875

(22) Filed: Jul. 11, 2002

(51) Int. Cl.⁷ .............................. A23L 1/00; A47J 27/04; A47J 27/52; A47J 37/00; A47J 37/06
(52) U.S. Cl. ........................... 99/346; 99/330; 99/345
(58) Field of Search .................. 99/330–332, 345–347, 99/372–380, 422–425, 400, 401, 516, 534–536; 126/20, 25 R, 9 R; 426/509–511, 523, 438, 439; 118/20, 30, 426; 134/142; 219/401

(56) References Cited

U.S. PATENT DOCUMENTS

| | | | | |
|---|---|---|---|---|
| 702,597 A | * | 6/1902 | Salmon | 99/345 |
| 1,700,614 A | * | 1/1929 | Moore | 99/347 X |
| 2,350,623 A | * | 6/1944 | Kruea | 99/345 X |
| 2,560,605 A | | 7/1951 | Shell | |
| 3,053,166 A | * | 9/1962 | Ashley | 99/345 |
| 3,311,048 A | * | 3/1967 | Pickering | 99/345 X |
| 3,713,378 A | * | 1/1973 | West et al. | 99/346 |
| 3,922,960 A | * | 12/1975 | Lewis | 99/346 |
| 4,066,010 A | * | 1/1978 | Larsson | 99/346 |
| 4,732,137 A | * | 3/1988 | Parsons | 126/25 R |
| 5,421,254 A | * | 6/1995 | McDonald | 99/346 |
| 5,727,449 A | * | 3/1998 | Healy et al. | 99/346 |
| 5,913,965 A | * | 6/1999 | Gargano | 99/346 |
| 6,530,308 B1 | * | 3/2003 | Lin | 99/330 |

* cited by examiner

Primary Examiner—Timothy F. Simone
(74) Attorney, Agent, or Firm—Browdy and Neimark, P.L.L.C.

(57) ABSTRACT

A device for distributing cooking juices over meat pieces during their cooking, provided with a device for withdrawing the juices from the base of the cooking pan and feeding them onto the surface of the meat undergoing cooking, comprising a tray having a flat base and, in the base, a sunken portion partially occupying said base, an upperly open container which loosely occupies the sunken portion, a portion of the container being defined by an endless wall, a cover which upperly closes the sunken portion in a sealed manner and upperly comprises a reservoir overlying the portion of the container and having in its base a hole closed by a valving float, and a tube which starts in proximity to the base of the portion of the container and extends to above the meat to be cooked.

13 Claims, 7 Drawing Sheets

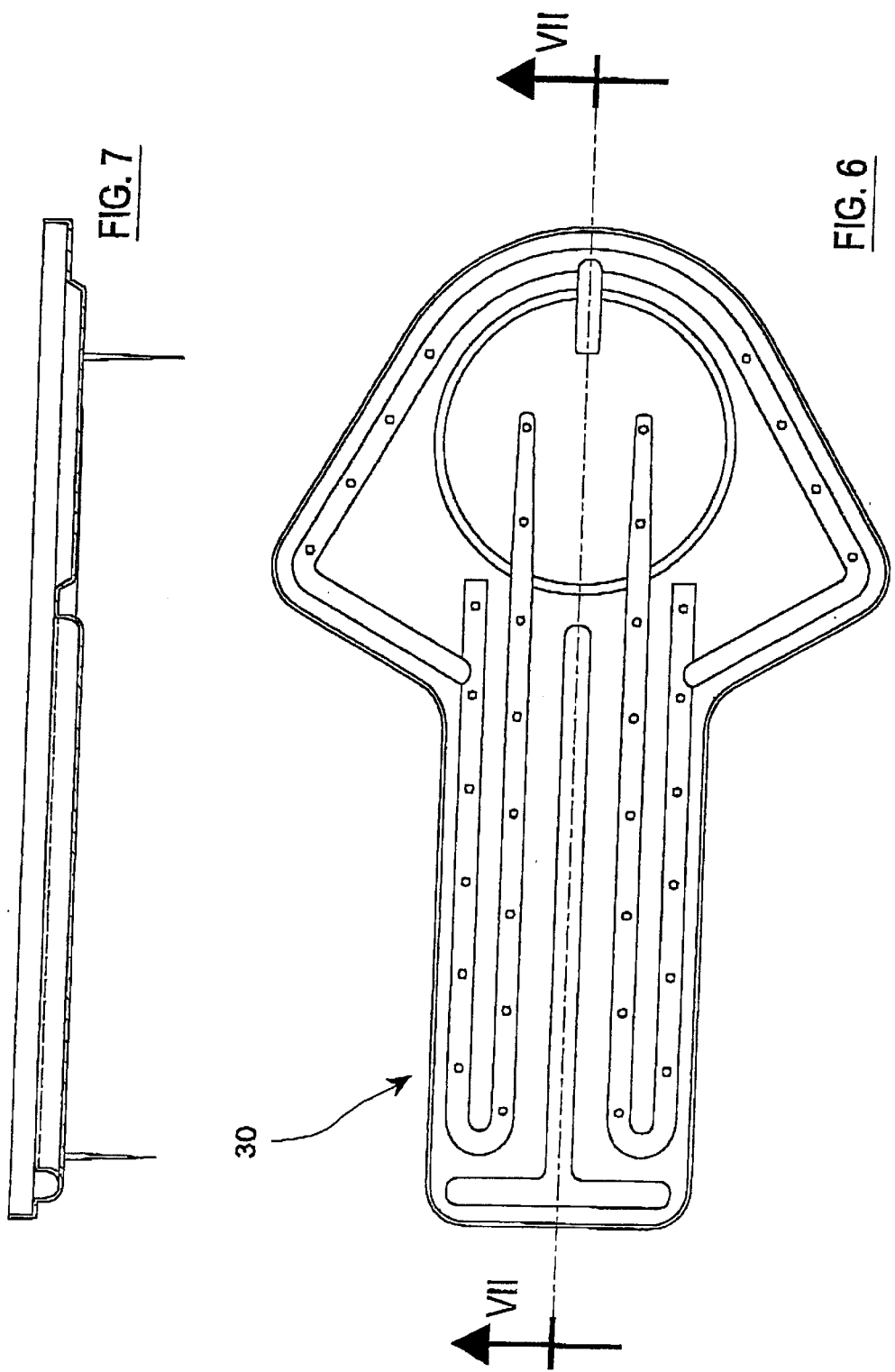

DEVICE FOR DISTRIBUTING COOKING JUICES OVER MEAT PIECES DURING COOKING

BACKGROUND OF THE INVENTION

In oven-cooking large meat pieces the cooking juices, in the form of molten fat, produced by the meat pieces or possibly added, are cyclically spread over the entire surface of the meat in order to improve its aroma and taste and to facilitate the formation of a golden crust.

Said requirement arises mainly in the oven-cooking of poultry and In particular turkey.

These animals are generally inserted onto the oven supported by a basket resting on a cooking pan.

They present a large quantity of fatty parts which during oven-cooking melt to collect on the base of the cooking pan.

As the fats represent the most important taste and aroma vehicle it is advisable, during the oven-cooking of such animals and of large meat pieces in general, to occasionally collect the dissolved fats which fall onto the base of the cooking pan and to spread them over the upper surface of the meat.

This operation is extremely disagreeable because of the high temperature at which the cooking takes place, of the order of 180° C., and of the large dimensions of the piece of meat, such as a turkey, undergoing cooking.

In this respect, the oven has to be opened, the pan containing the meat or turkey has to be at least partly extracted, the juices have to be collected with a manually operated suction pump or a small ladle or a brush for their distribution over the meat, the pan has to be returned to its position and the oven closed.

Apart from the undesirable temperature change caused by opening the oven, which sometimes compromises proper cooking, all the listed operations are not only disagreeable and liable to result in bums, but also keep the cook engaged for the entire cooking time. Devices are known for facilitating the said fat distribution over the meat surface, these being generally similar to that described in U.S. Pat. No. 2 560,605 in the name of Shell.

Said known devices comprise a dish-shaped perforated dome formed of sheet metal or the like. The dome has a number of perforations provided therein at a marginal edge thereof and the uppermost portion of the dome has a boss surrounding a hole in which a hollow tube is received.

This tube extends upwardly or outwardly from the dome and is substantially vertical when the device is in use.

An expelling spout formed of tubular stock is in telescoping engagement with the tube. The expelling spout is manually adjusted on a desired position with respect to the outermost end thereof. The upper portion of the expelling spout is arched and presents a short portion that is disposed radially to overly the piece of meat to be cooked. This arched portion terminates in the open outlet end of the spout and when the food is being prepared this portion of spout will effectively direct the juices onto the top of any food that is being prepared.

Known devices present the drawback of a difficult and insufficient rise of the molten fat and of the juices along the curved tube, and extremely irregular and unpredictable operation.

SUMMARY OF THE INVENTION

The object of this invention is to provide a device which makes said operations completely automatic, so overcoming the drawbacks of the known art.

In a totally general manner said object is attained by a device comprising a meat cooking tray in which the juices are collected, a hole in said tray to cause the juices to pour into an underlying first container sealedly closed by a mushroom float, a second container containing water and connected to said first container, and a tube extending from the base of said first container and opening above the meat contained in the tray.

The hole in said first container is preferably surrounded by a funnel. Preferably said object is attained by a device in which the cooking pan comprises a tray having a flat base and, in the base, a sunken portion partially occupying said base. A container loosely occupies said sunken portion, a portion of said container being defined by a wall comprising an upper reservoir presenting in its base a hole closable from below by a valving float, and a hole communicating with the adjacent chamber external to the wall.

The reservoir is preferably formed in a cover which upperly closes the sunken portion in a sealed manner, a tube starting from close to the base of said closed portion and extending as far as the meat to be cooked.

The merits and the constructional and operational characteristics of the invention will be apparent from the detailed description of two preferred embodiments thereof given hereinafter by way of non limiting example with reference to the accompanying drawings.

BRIEF DESCRIPTION OF THE ACCOMPANYING DRAWINGS

FIG. 6 is a plan view of a further component of the second embodiment of the invention.

FIG. 7 shows the section VII—VII of FIG. 6.

DETAILED DESCRIPTION OF THE PREFERRED EMBODIMENT

Figure 1:
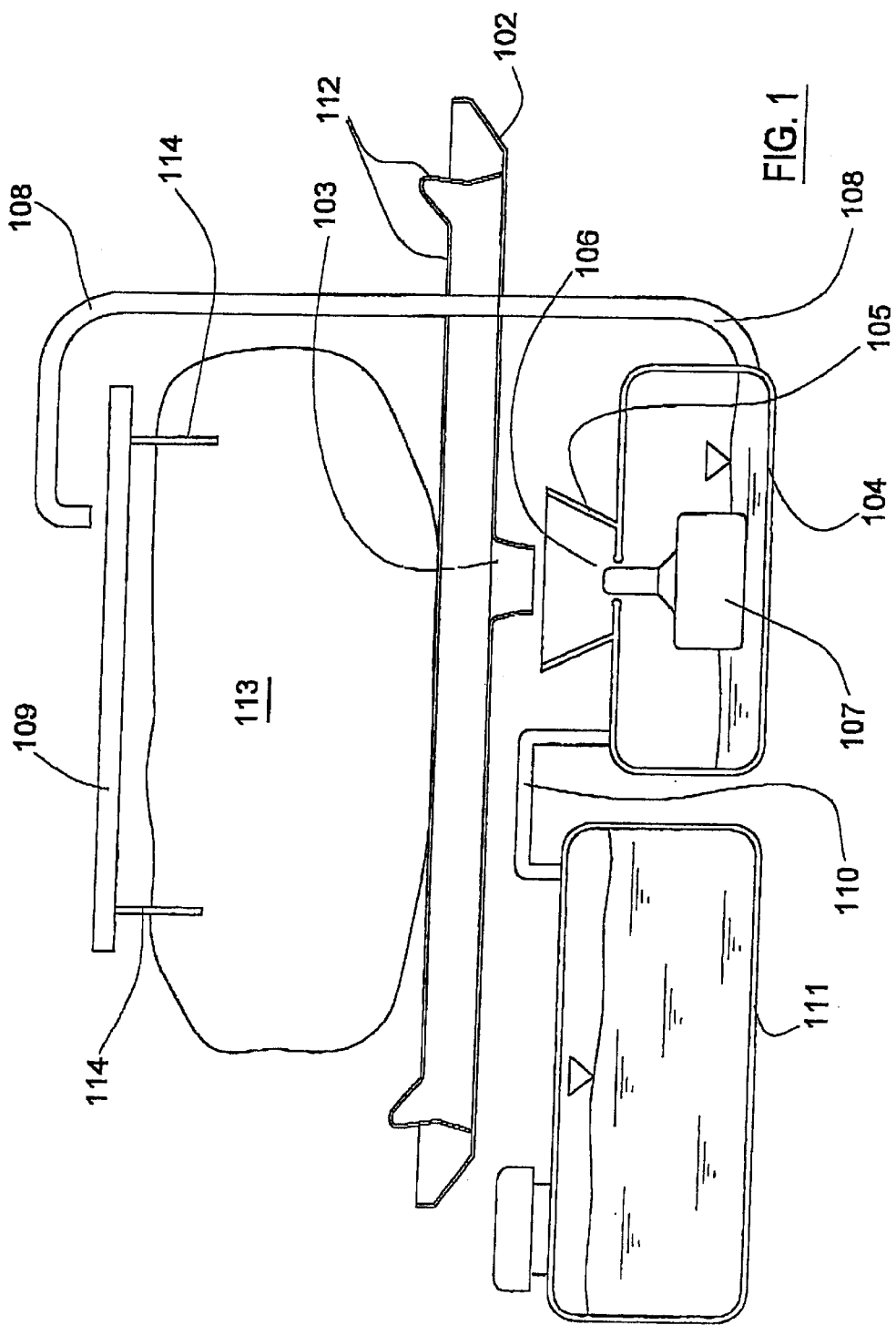
FIG. 1 is a section through a first embodiment.

FIG. 1 shows a simplified embodiment of the invention.

It comprises a tray 102 provided with a hole 103 overlying a first container 104 which comprises an upper funnel 105 surrounding a hole 106.

The tray 102 comprises a basket 112 arranged to support the meat 113 to be cooked.

The hole 106 is closed by a mushroom valve 107 which acts from below.

The mushroom valve extends upperly, via a cylindrical appendix, above the hole closed by it in order to prevent any tendency of the hydrostatic pressure of the juices to open the valve.

From the container 104 there branches, in proximity to its base, a tube 108 which extends to above the tray 102 where it terminates with a perforated collector 109.

The collector 109 presents needle feet 114 to be inserted into the meat 113 and possesses those characteristics fully described in the second embodiment of the invention.

Into the top of the container 104 there extends a tube 110 branching from the top of a second container intended to contain water.

The first and second container are Intended to be placed in the oven is together with the meat to be cooked.

The operation of the device is explained hereinafter.

The second embodiment is shown in FIGS. 2 to 8, which show a profiled frame 1 of steel wire integral with the basket 11 which is to receive the meat to be cooked, such as a turkey, and also forms the support for the tray 2.

Figure 2:
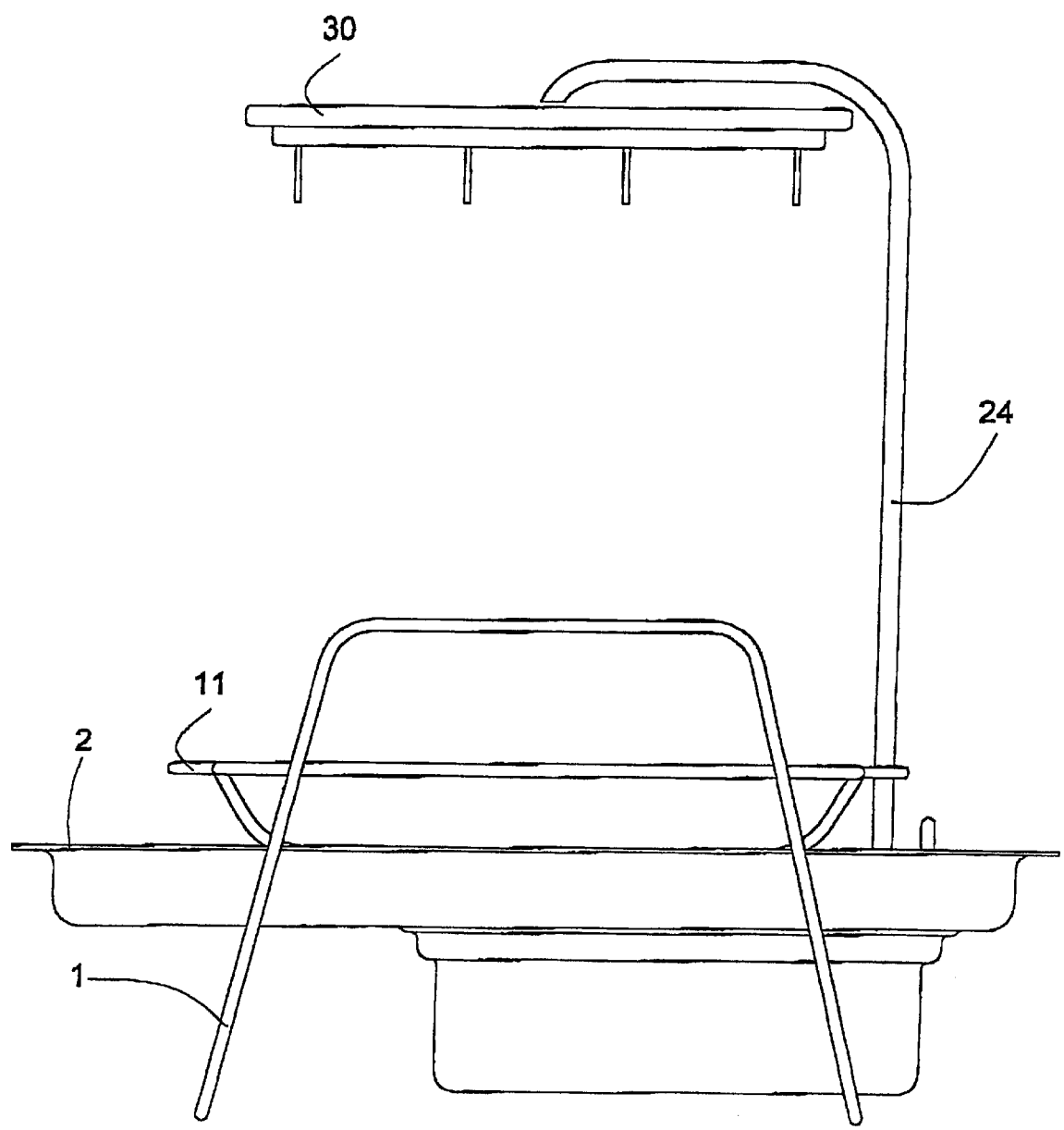
FIG. 2 is a side view of the second embodiment of the invention.
Figure 3:
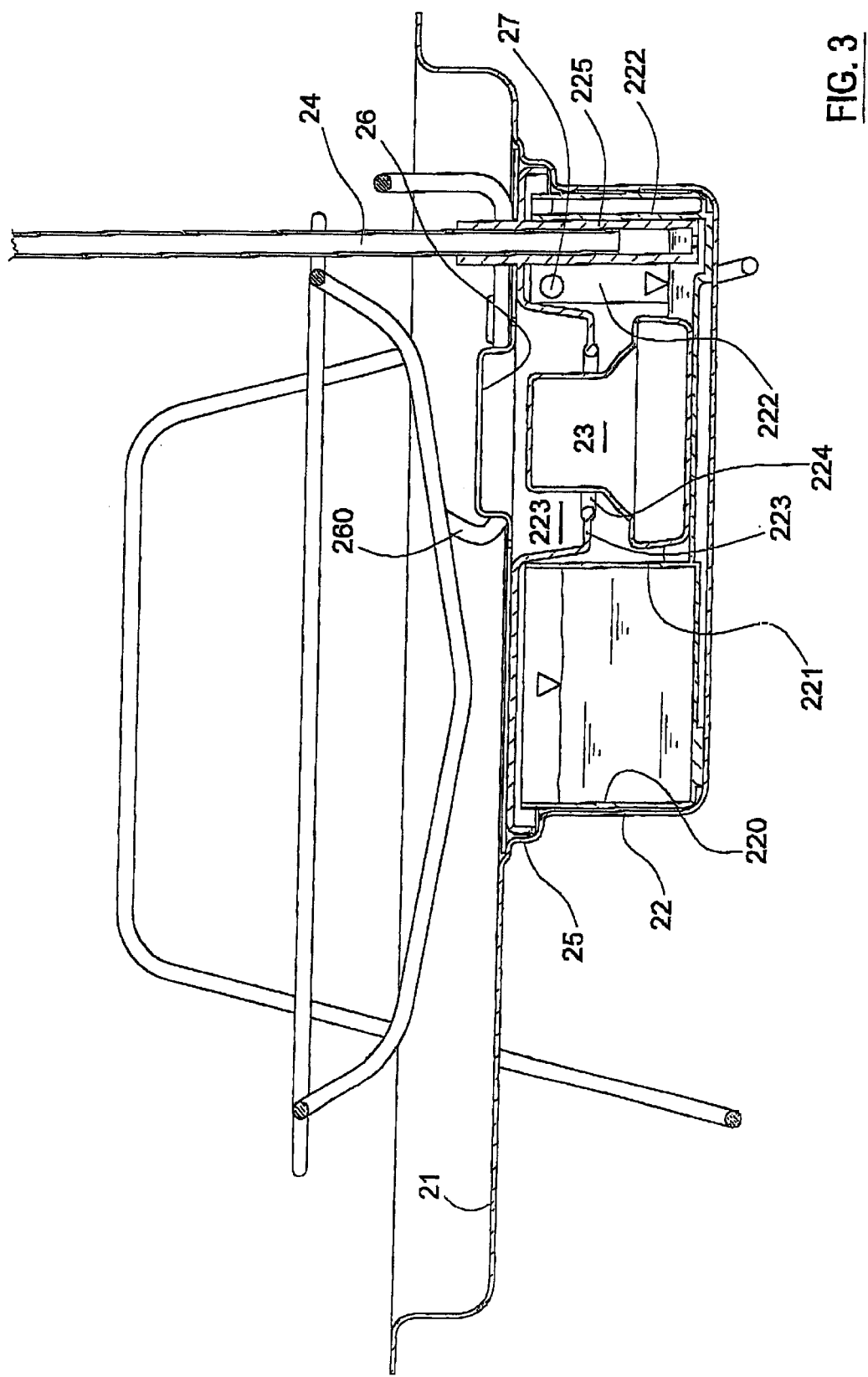
FIG. 3 is an enlarged partial section through the second embodiment of the invention.
Figure 4:
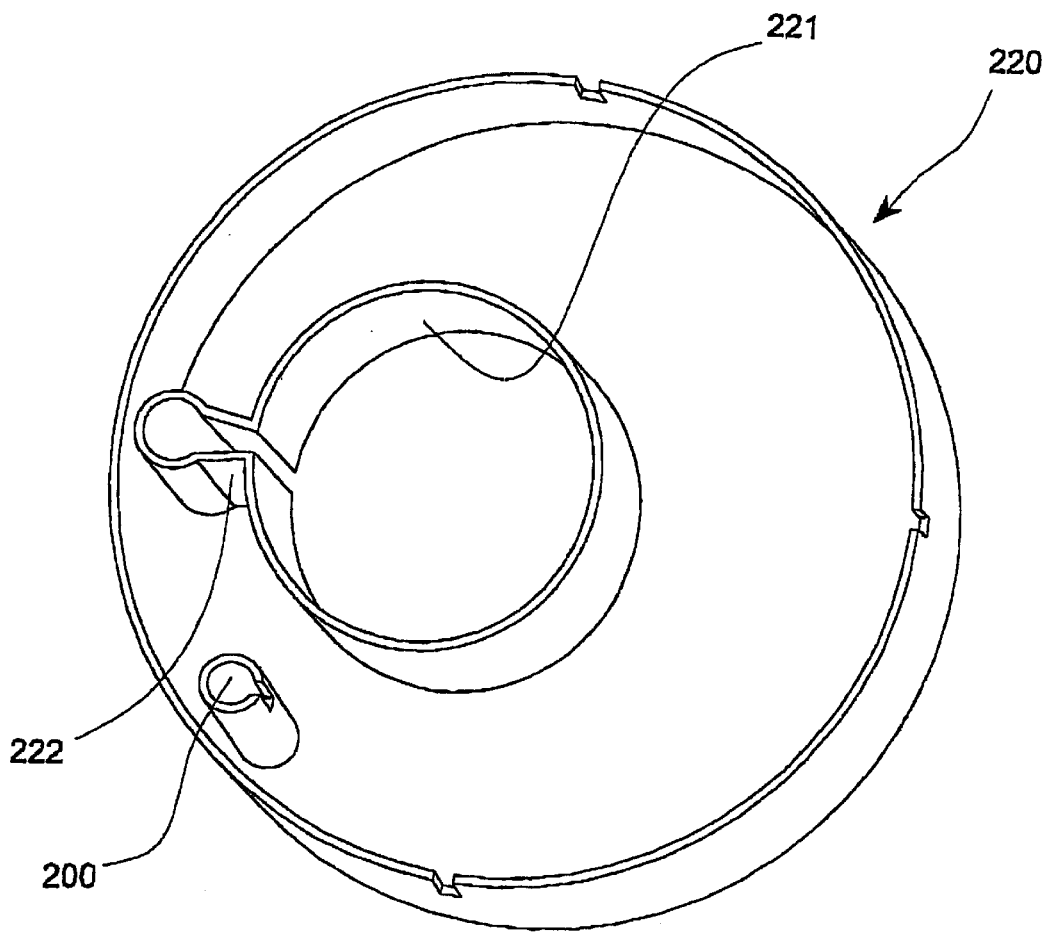
FIG. 4 is a perspective view of a component of the second embodiment of the invention.
Figure 5:
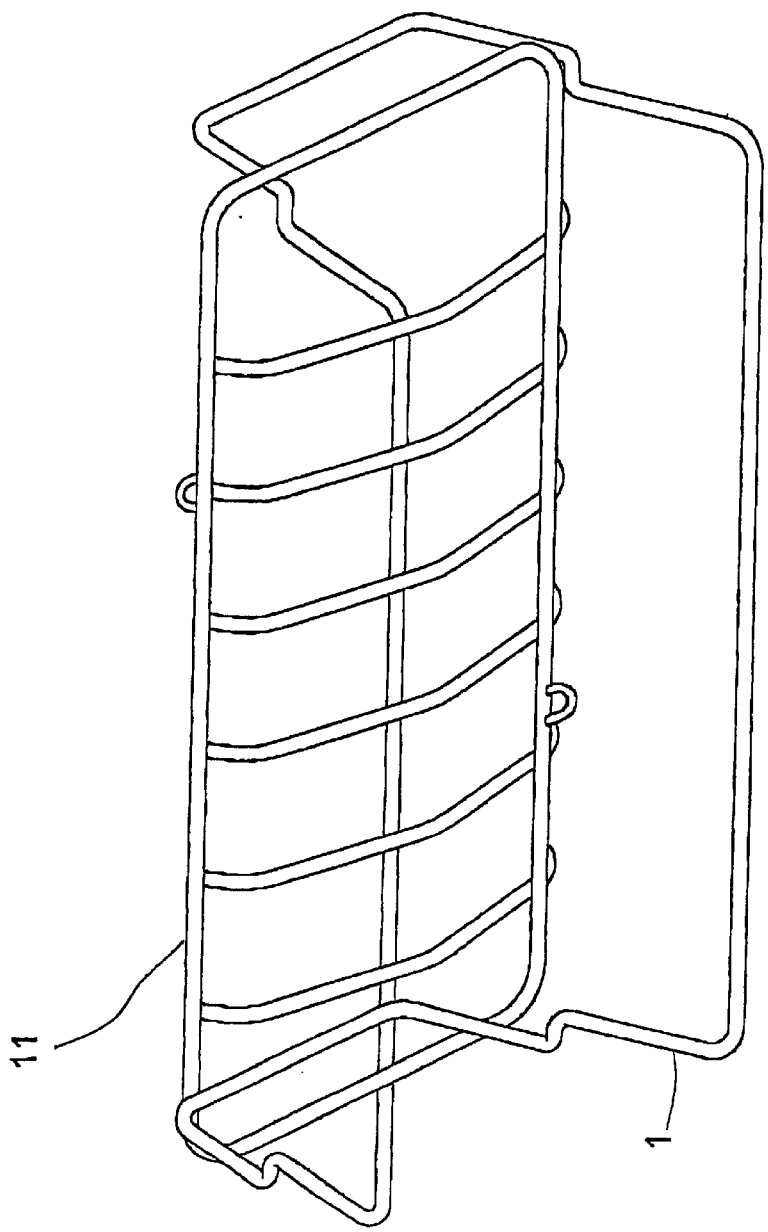
FIG. 5 is a perspective view of another component of the second embodiment of the invention.
Figure 8:
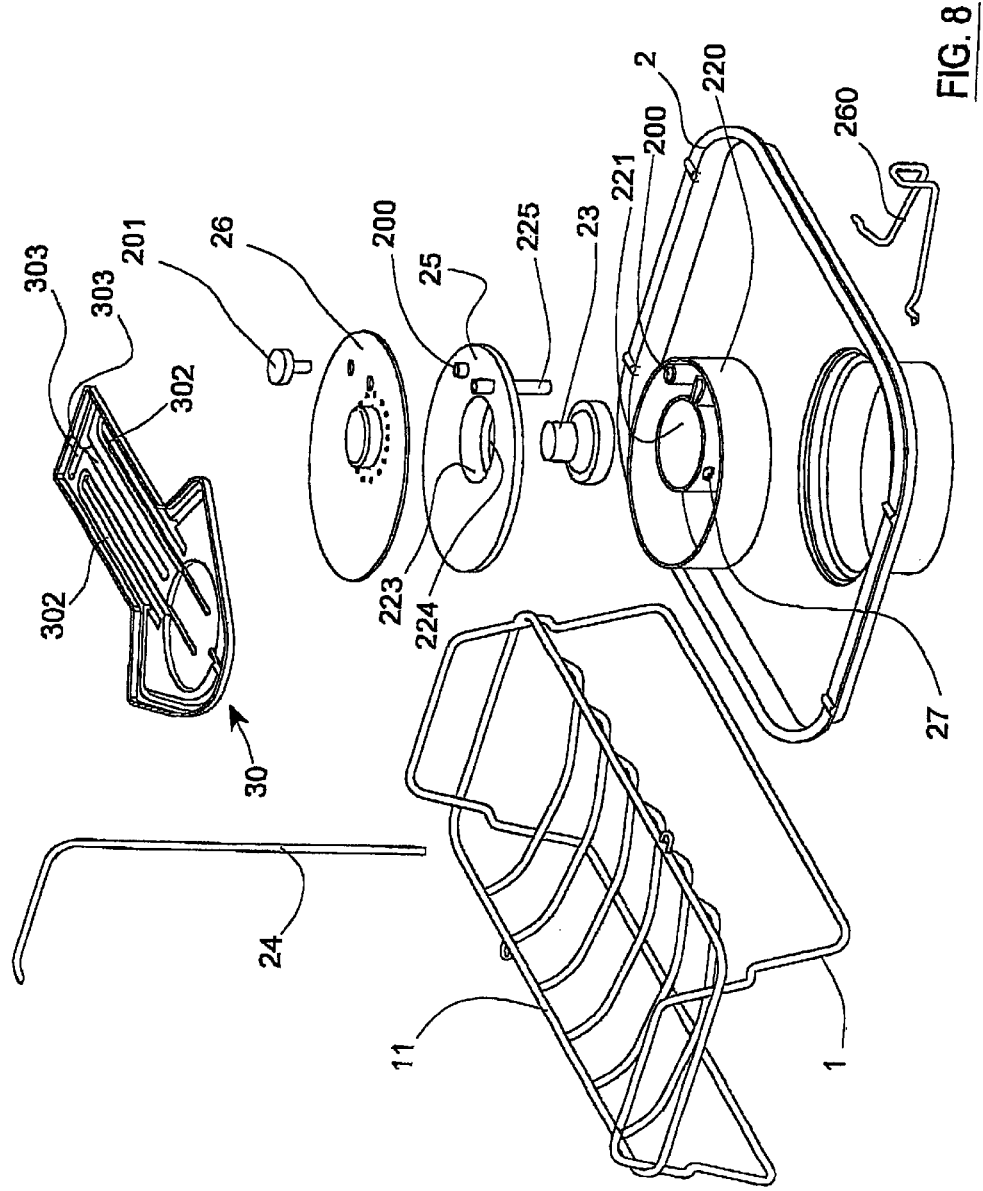
FIG. 8 is an exploded view of the second embodiment of the invention.

As shown in FIGS. 2 and 3, the tray 2 comprises a wide flat portion 21, in one side of which a cylindrical sunken portion 22 is provided. The sunken portion 22 receives with a small degree of slack a cylindrical inner container 220 comprising a cylindrical wall 221 open towards a bulge 222, the end of which is shaped as a cylindrical portion to receive a tube 225 which reaches close to its base.

The portion defined by the cylindrical wall 221 is overlaid by a reservoir 223 provided with a central hole 224.

A mushroom-shaped float 23 is positioned coaxially to the hole 224, to perfectly close it when raised.

A vertical tube 24 sealedly engaged in the tube 225 extends upwards above the surface of the tray 2.

A profiled cover 24 comprising the reservoir 223, the vertical tube 225 and the seat 200 of a valve 201 openable from the outside, upperly seals the sunken portion 22.

A hole 27 close to the top of the wall 221 connects the portion enclosed thereby to the interior of the container 220.

Both the container 220 and the cover 25 can be conveniently made of synthetic material.

A plate 26 is fixed by a spring 260 to the cover 25 to maintain this in position, and presents holes for the passage of the tube 225 and the valve seat 200, together with other holes lying above the reservoir 223 for passage of the molten fat.

The tube 24 rises to above the basket 11 integral with the frame 1 and intended to receive the meat to be cooked.

The end of the tube 24 is bent downwards to lie above a juice collector 30, which is lowerly perforated in the manner of a shower head.

The collector 30 is provided with needle-shaped lower feet to be inserted into the meat resting in the basket 11, in order to maintain the collector 30 perfectly horizontal.

More precisely, the collector 30 has a plan shape similar to that of a turkey tied ready for cooking.

It presents channels 302 with an inclined base to favour distribution of the molten fat and juices.

A T-shaped depression 303 used for leveling purposes is provided in the base of the collector 30.

The invention operates in the following manner.

The meat to be cooked, for example a turkey, is placed in the basket 11, 112.

The collector 30, 109 is fixed perfectly horizontal onto the meat by means of the needle feet 301, 114.

In the first embodiment the container 111 is filled with water.

In the second embodiment that part of the container 220 external to the wall 221 is filled with water, as is the thin interspace on the outside of the container 220 between this latter and the sunken portion 22.

The water contained in the interspace facilitates rapid heating of the water contained in the container 220, and on reaching a certain temperature close to 100° C. evaporates to create an interspace of steam which slows down the heat transfer and hence the evaporation of the water contained in the container 220.

The tube 24, 108 is inserted into its seat, and its end is positioned to lie above the collector 30, 109.

The valve 201 inserted into the hole 200 is closed.

The entire assembly is then inserted into an oven maintained at the cooking temperature typical for that type of meat, generally between 180° C. and 190° C.

The fat which begins to flow during cooking collects on the base of the tray 2, 102 and falls into the funnel 105 or reservoir 223 and from this latter passes through the hole 224, 106 to collect within the cylindrical wall 221 or container 104.

When the fat level within the wall 221 or container 104 increases, the float 23, 107 rises until it closes the hole 224, 106.

At this point, because of the evaporation of the water contained in the container 220 external to the wall 221, or in the container 104, the pressure within the compartment containing the fat increases until this latter is pushed through the tube 24, 108 and into the collector 30, 109, from which it falls onto the meat.

The exit of the molten fat causes the pressure in the compartment defined by the wall 221, or in the container 104, to decrease until the float 23, 107 falls by gravity.

The seal between the float 23, 107 and the respective hole is aided by the head of fat which collects in the reservoir 223 or in the funnel 105.

When the float falls the pressure reaches zero and the cycle is repeated.

A valve 201 is provided in the hole 200 to manually discharge the pressure, if desired.

The function of the water contained in the interspace between the container 220 and the sunken portion 22 is to slow down the heating and hence the evaporation of the water to prevent this evaporating completely before completion of the cooking cycle.

It has been found that a quantity of between about 500 and 600 grams of water is sufficient to cook a turkey of average size.

While a preferred embodiment of the present invention has been described, such description is for illustrative purposes, and it is to be understood that changes and variations may be made without departing from the spirit or scope of the following claims.

What is claimed is:

1. A device for distributing cooking juices over meat pieces during their cooking, provided with means for withdrawing the juices from the base of the cooking pan and feeding them onto the surface of the meat undergoing cooking, comprising a tray having a flat base and, in the base, a sunken portion partially occupying said base, an upperly open container which loosely occupies said sunken portion, a portion of said container being defined by an endless wall, a cover which upperly closes said sunken portion in a sealed manner and upperly comprises a reservoir overlying said portion of the container and having in its base a hole closed by a valving float, a tube which starts in proximity to the base of said portion of the container and extends to above the meat to be cooked.

2. A device as claimed in claim 1, in which a plate is fixed onto said cover and has that region overlying said reservoir provided with holes for passage of the juices.

3. A device as claimed in claim 1, in which the cover presents a seat for a manually operable valve.

4. A device as claimed in claim 1, in which at least a portion of said tube is integral with the cover.

5. A device as claimed in claim 1, comprising a collector to be fixed onto the meat to be cooked, and provided with holes for passage of the juices.

6. A device as claimed in claim 5, in which said collector has a plan shape similar to the shape of a turkey tied ready for cooking.

7. A device as claimed in claim 5, in which the base of said collector comprises inclined channels provided with holes for distribution of the juices.

8. A device as claimed in claim 5, in which said collector presents a T-shaped depression used for leveling purposes.

9. A device as claimed in claim 1, in which said float extends beyond the hole via a cylindrical appendix, to prevent the juices contained in the reservoir from exerting hydrostatic action on the float.

10. A device as claimed in claim 1, in which said container and said cover are of plastic material.

11. A device for distributing cooking juices over meat pieces during their cooking, provided with means for withdrawing the juices from the base of the cooking pan and feeding them onto the surface of the meat undergoing cooking, comprising a meat cooking tray in which the juices are collected, a hole in said tray to enable the juices to flow into an underlying first container sealedly closed by a mushroom float, a second container containing water and connected to said first container, and a tube starting from the base of said first container and opening above the meat contained in the tray.

12. A device as claimed in claim 11, in which the hole in said first container is surrounded by a funnel.

13. A device as claimed in claim 11, in which said float extends beyond the hole via a cylindrical appendix, to prevent the juices contained in the reservoir from exerting hydrostatic action on the float.

* * * * *